United States Patent
Sugiyama et al.

(10) Patent No.: US 9,821,409 B2
(45) Date of Patent: Nov. 21, 2017

(54) LASER CUTTING METHOD

(75) Inventors: Akihiko Sugiyama, Kanagawa (JP); Hiroaki Ishiguro, Kanagawa (JP)

(73) Assignee: AMADA COMPANY, LIMITED, Kanagawa (JP)

( * ) Notice: Subject to any disclaimer, the term of this patent is extended or adjusted under 35 U.S.C. 154(b) by 92 days.

(21) Appl. No.: 14/344,148

(22) PCT Filed: Sep. 13, 2012

(86) PCT No.: PCT/JP2012/073497
§ 371 (c)(1),
(2), (4) Date: Mar. 11, 2014

(87) PCT Pub. No.: WO2013/039161
PCT Pub. Date: Mar. 21, 2013

(65) Prior Publication Data
US 2014/0339207 A1    Nov. 20, 2014

(30) Foreign Application Priority Data

Sep. 16, 2011 (JP) .................................. 2011-203416
Aug. 10, 2012 (JP) .................................. 2012-177867

(51) Int. Cl.
*B23K 26/073* (2006.01)
*B23K 26/38* (2014.01)
*B23K 26/08* (2014.01)

(52) U.S. Cl.
CPC ...... *B23K 26/0734* (2013.01); *B23K 26/0869* (2013.01); *B23K 26/38* (2013.01)

(58) Field of Classification Search
CPC ........................ B23K 26/0734; B23K 26/0869
See application file for complete search history.

(56) References Cited

U.S. PATENT DOCUMENTS 5,052,772 A * 10/1991 Okamoto ............... G02B 5/001
  359/326
5,444,211 A *  8/1995 Nakata ................. B23K 26/123
  219/121.61
(Continued)

FOREIGN PATENT DOCUMENTS

JP    11-014945    1/1999
JP    11-058059    3/1999
(Continued)

OTHER PUBLICATIONS

Official Action, with English-language translation thereof, for JP Appl. No. 2012-177867 dated Apr. 22, 2016.
(Continued)

*Primary Examiner* — Tu B Hoang
*Assistant Examiner* — Erin McGrath
(74) *Attorney, Agent, or Firm* — Greenblum & Bernstein, P.L.C.

(57) ABSTRACT

A laser cutting method and a laser cutting apparatus cut a metallic work with a laser beam of a one-micrometer waveband. The method and apparatus carry out the laser cutting of the work with a ring beam RB passed through a focus position of a condenser lens 13 and having inner and outer diameters that tend to expand. The outer diameter of the ring beam is in a range of 300 μm (micrometers) to 600 μm, an inner diameter ratio of the same is in a range of 30 % to 70 %, and a focal depth of the condenser lens is in a range of 2 mm to 5 mm.

8 Claims, 7 Drawing Sheets

(56) References Cited

U.S. PATENT DOCUMENTS

| | | | |
|---|---|---|---|
| 5,963,374 A | 10/1999 | Endou et al. | |
| 6,326,586 B1 | 12/2001 | Heyerick et al. | |
| 6,693,256 B2 * | 2/2004 | Furujo | B23K 26/0665 219/121.72 |
| 7,495,838 B2 * | 2/2009 | Krneta | G02B 7/023 359/641 |
| 2012/0031883 A1 * | 2/2012 | Kumamoto | B23K 26/0648 219/121.78 |

FOREIGN PATENT DOCUMENTS

| | | | |
|---|---|---|---|
| JP | 2001-38485 | 2/2001 | |
| JP | 2007-75878 | 3/2007 | |
| JP | 2010-194558 | 9/2010 | |
| JP | 2011-121107 | 6/2011 | |
| JP | EP 2399703 A1 * | 12/2011 | B23K 26/38 |
| WO | 2010/095744 | 8/2010 | |

OTHER PUBLICATIONS

Extended European Search Report for EP App. No. 12831084.4, dated Feb. 11, 2016.

* cited by examiner

FIG. 1
Prior Art
(A)
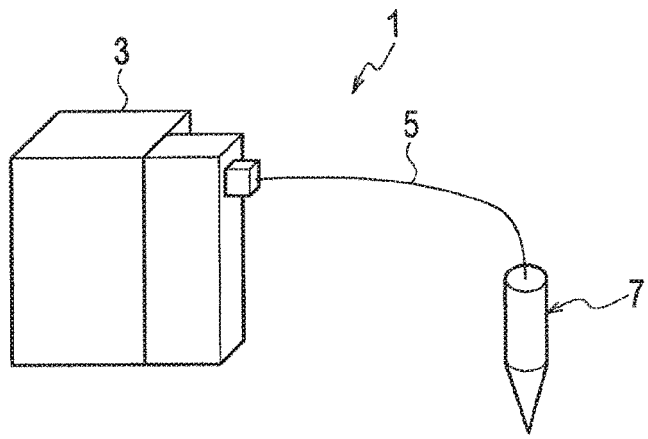
(B)
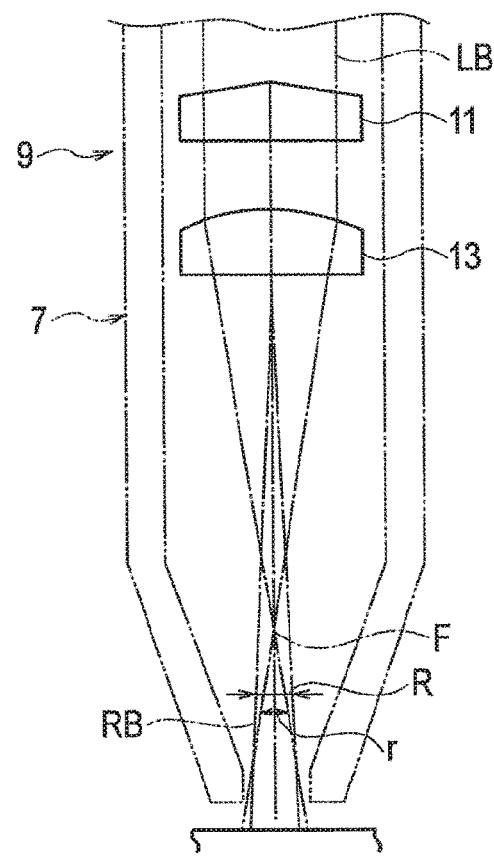

FIG. 2
(A)
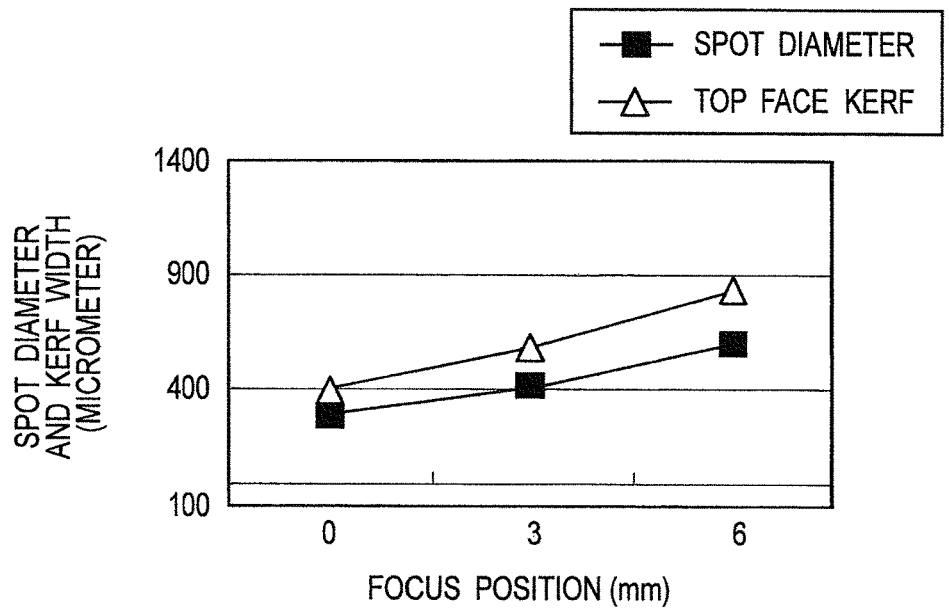
(B)
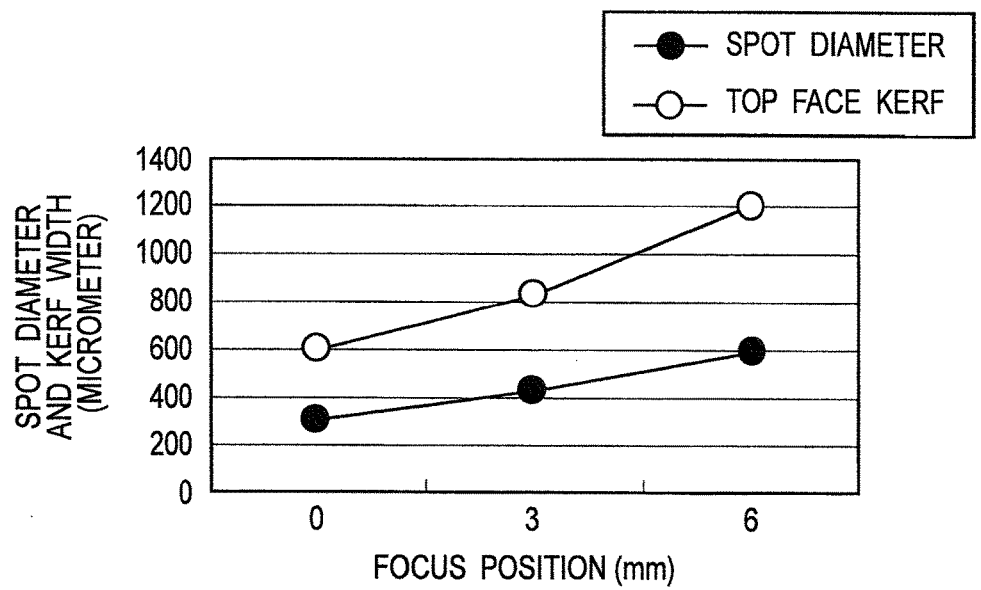

FIG. 3
(A)
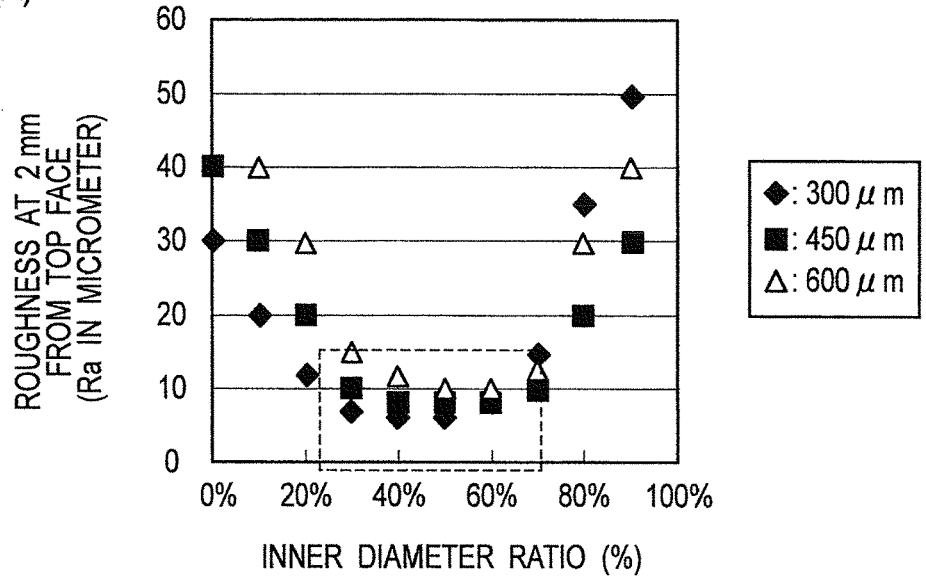
(B)
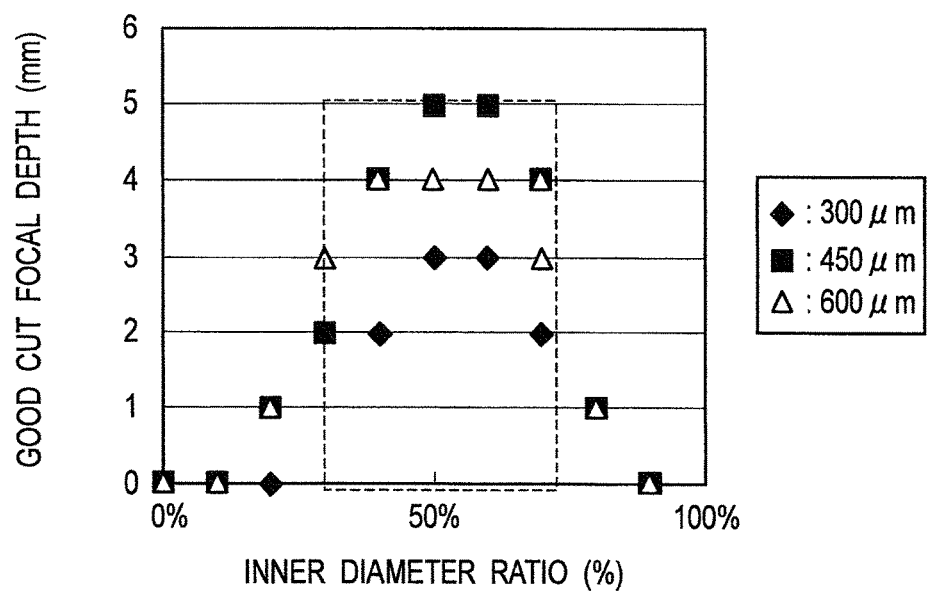

FIG. 4
(A)
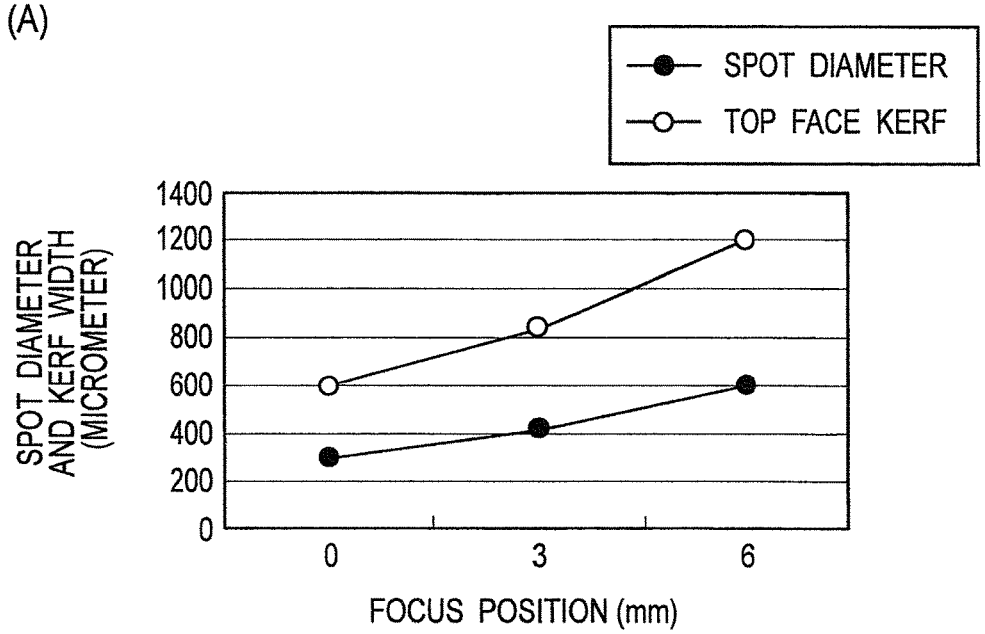
(B)
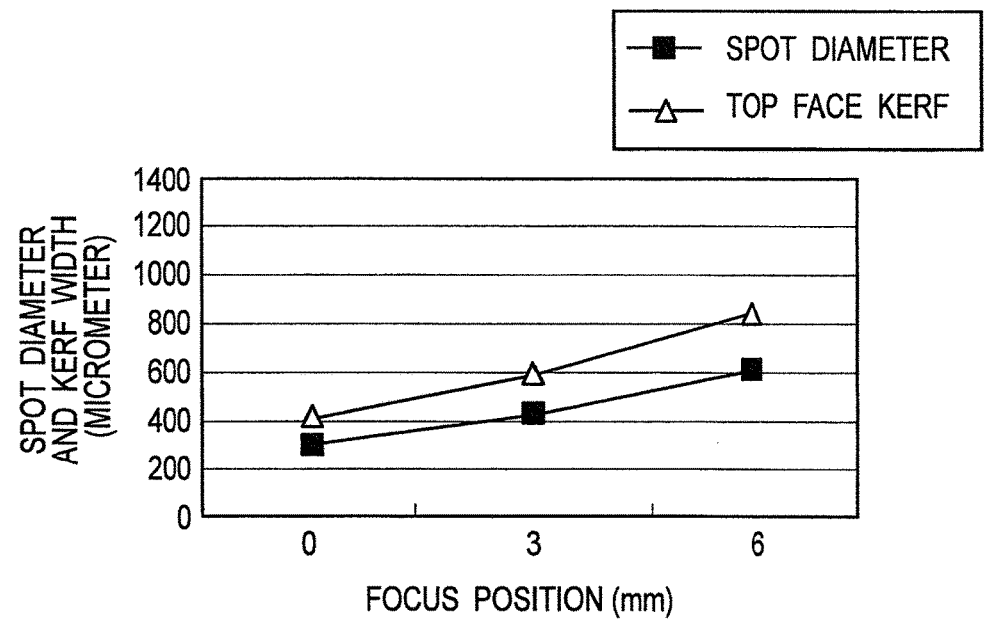

LASER CUTTING METHOD

TECHNICAL FIELD

The present invention relates to a laser cutting method and apparatus for cutting a metallic work with a laser beam of a one-micrometer waveband, and particularly, to a method and an apparatus for forming a laser beam into a ring beam and cutting a work with the ring beam.

BACKGROUND ART

When cutting a metallic work with a laser beam, the laser beam is condensed through a condenser lens into a spot of 100 μm (micrometers) to 500 μm (micrometers) to increase energy density and instantaneously heat the work to a metal melting point of 1500 degrees or over so that the work melts or sublimates. At the same time, an assist gas is fed to remove melted material and cut the work. When the work is a thick mild steel sheet (carbon steel sheet), an oxygen gas is used as the assist gas to generate oxidization reaction heat and utilize the heat as well for cutting the work.

A laser beam of a one-micrometer waveband from a solid-state laser or fiber laser realizes a very high optical energy absorptance on a metallic work compared with a laser beam of a ten-micrometer waveband from, for example, a CO2 laser. If the one-micrometer waveband laser beam is used with an oxygen assist gas to cut a mild steel sheet work, a melt width on a top face of the work widens more than necessity to impair kerf control. In addition, excessive burning (self-burning) may occur to deteriorate the quality of the laser cutting.

Tests were conducted to compare changes in kerf width on a top face of a work between the CO2 laser and the fiber laser by equalizing spot diameters of laser beams emitted from the lasers, by employing the same laser processing conditions (such as laser output and oxygen gas pressure), and by changing a focus position of each laser beam in a range of 0 mm to 6 mm from the top face of the work. As illustrated in FIG. 2(A), the CO2 laser demonstrated similar changes in both the kerf width and the focus position from the top face of the work. On the other hand, as illustrated in FIG. 2(B), the fiber laser demonstrated larger changes in the kerf width than in the focus position. Namely, the fiber laser provides greater thermal effect on the work than the CO2 laser.

This means that the laser beam of a one-micrometer waveband from the solid-state laser or fiber laser has a very high energy density in the vicinity of the center of the laser beam, and therefore, achieves a very high optical energy absorptance on a work. When cutting a work with a laser beam according to a required cut width, the laser beam is condensed to have a required spot diameter. At this time, if an oxygen gas is used as an assist gas for cutting the work, the work will easily cause self-burning to expand a melt width on a top face of the work (for example, a mild steel sheet) wider than the required cut width. Then, it is difficult to properly conduct kerf control or stabilize the quality of the cut work. It is required, therefore, for the laser cutting work using the fiber laser and oxygen assist gas to realize the same cutting quality as that realized by the CO2 laser.

For this, various tests were made and it was found that forming a laser beam of the fiber laser into a ring beam and cutting a work with the ring beam provide the same effect as that provided by the CO2 laser.

A related art that forms a laser beam of the fiber laser into a ring beam and cuts a work with the ring beam is disclosed in WO2010/095744A1 (Patent Literature 1).

SUMMARY OF INVENTION

Problems to be Solved by Invention

FIG. 1 schematically and conceptually illustrates a laser cutting apparatus described in the Patent Literature 1. The laser cutting apparatus 1 includes a laser oscillator 3 such as a solid-state laser or a fiber laser. The laser oscillator 3 is connected to a first end of a process fiber 5. A second end of the process fiber 5 is connected to a laser processing head 7. The laser processing head 7 incorporates a collimation lens (not illustrated) that forms a laser beam LB emitted from an emission end (second end) of the process fiber 5 into a parallel beam. The laser processing head 7 also incorporates a ring beam forming unit 9 that forms the parallel beam into a ring beam. The ring beam forming unit 9 is made of a combination of a conical axicon lens 11 and a condenser lens 13.

According to this configuration, an inner diameter r and an outer diameter R of the ring beam RB gradually increase after passing through a focus position F of the condenser lens 13. Namely, on the lower side of the focus position F, the ring beam RB increases its inner diameter r and outer diameter R as well as a ratio between the inner diameter r and the outer diameter R.

A laser cutting method according to the invention described in the Patent Literature 1 cuts a carbon steel sheet work such as a mild steel sheet work by irradiating the work with a ring-shaped laser beam (ring beam) to heat the work. To the heated part, the related art jets an oxygen gas to burn the work and remove combustion products and melted material from the work with the kinetic energy of the oxygen gas, thereby cutting the work.

Namely, the laser cutting method described in the Patent Literature 1 differs from the conventional laser cutting method that uses energy of a laser beam to evaporate or melt a work and cut the work. Instead, it resembles to a conventional gas cutting method (refer to a paragraph 0020 of the Patent Literature 1).

According to the invention described in the Patent Literature 1, a part of the work irradiated with the ring beam is heated to about 900 to 1000 degrees centigrade without causing evaporation or fusion. To the part of the work heated to this temperature, an oxygen gas is jetted from a nozzle in the direction of an axis of the ring beam to burn the work (mother material) and produce fused material. The fused material and combustion products are removed from the mother material by the kinetic energy of the jetted oxygen gas, thereby cutting the work (mother material).

s mentioned above, the part of the work irradiated with the ring beam is heated to 900 to 1000 degrees centigrade without causing evaporation or fusion. To achieve this, the related art sets an inner diameter of the ring beam to 0.5 mm to 2 mm and an outer diameter thereof to 1.5 mm to 3 mm (refer to paragraphs 0029 and 0030 of the Patent Literature 1).

The invention described in the Patent Literature 1 heats the work surface to 900 to 1000 degrees centigrade with the ring beam and cuts the work with the jetted oxygen gas and the combustion heat produced by continuation of the burning of the work itself. The oxygen gas is sufficiently fed into a cut groove of the work to blow continuously produced combustion and fusion materials. The outer diameter of the ring beam is set to 1.5 mm to 3 mm to thermally cut even a thick sheet. The width of the cut groove is wide such as 1 mm or greater.

A laser cutting process on a work is carried out by condensing a laser beam through a condenser lens into a spot of 100 μm to 500 μm. According to the thickness and the like of the work, the position of the spot (a focus position of the condenser lens) is changed to a top face of the work, above the top face, below the top face, or any other location and the work is cut with the laser beam. The width of a cut groove formed by the laser cutting on the work is, even in a wider case, about 0.3 mm to 0.6 mm.

When the fiber laser is used to cut a work such as a mild steel sheet, a laser beam from the fiber laser is condensed to a spot of 100 μm to 500 μm. The fiber laser has a one-micrometer waveband and achieves a high optical energy absorption on the work and a very high energy density at the center of the laser beam. If oxygen and/or air is used as an assist gas like the case of the CO2 laser, the fiber laser will cause self-burning of the work to enlarge the width of a cut groove more than required.

Therefore, cutting a work such as a mild steel sheet with the use of the fiber laser is required to provide the same cutting result as with the CO2 laser even if oxygen and/or air is used as an assist gas.

Means to Solve Problems

In consideration of the problems of the related art mentioned above, a technical aspect of the present invention provides a laser cutting method of cutting a work of metallic material with a laser beam of a one-micrometer waveband. The method carries out the laser cutting of the work with a ring beam passed through a focus position of a condenser lens and having inner and outer diameters that tend to expand, wherein the outer diameter of the ring beam is in a range of 300 μm to 600 μm and an inner diameter ratio of the same is in a range of 30% to 70%.

Another technical aspect of the present invention provides a laser cutting method of cutting a work with a laser beam that tends to become a ring beam whose inner and outer diameters expand after passing a focus position of a condenser lens arranged in a laser processing head. The method applies a non-ring part of the laser beam to a surface of the work to carry out a piercing process, and thereafter, changes the laser beam applied to the surface of the work to the ring beam to carry out the laser cutting of the work.

BRIEF DESCRIPTION OF DRAWINGS

FIG. 1 is an explanatory view schematically and conceptually illustrating a configuration of a laser cutting apparatus according to a related art.

FIG. 2 is an explanatory view illustrating spot diameter and top face kerf relationships of a CO2 laser and fiber laser, in which FIG. 2(A) illustrates the spot diameter and top face kerf width relationship of the CO2 laser and FIG. 2(B) illustrates that of the fiber laser.

FIG. 3 is an explanatory view illustrating test results about a preferable inner diameter ratio of a ring beam according to an embodiment of the present invention, in which FIG. 3(A) illustrates a relationship among outer beam diameter, inner diameter ratio, and cut quality and FIG. 3(B) illustrates a relationship among outer beam diameter, inner diameter ratio, and focal depth for preferable cut.

FIG. 4 is an explanatory view illustrating a relationship between beam diameter and top face kerf when cutting a work with a fiber laser beam, in which FIG. 4(A) is with a standard condenser lens and FIG. 4(B) is with a ring beam.

MODE OF IMPLEMENTING INVENTION

Figure 5:
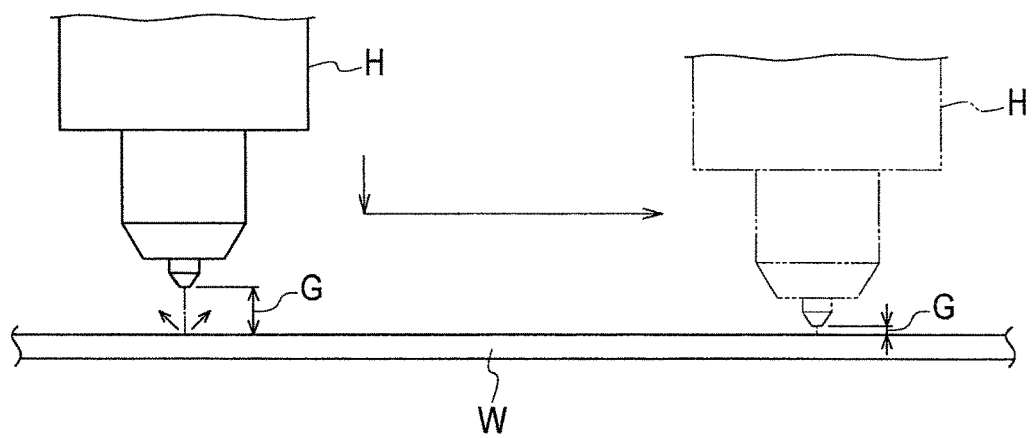
FIG. 5 is an explanatory view illustrating an operation to shift a piercing process to a cutting process.

Embodiments of the present invention will be explained with reference to the drawings. The configuration, concept, and scheme of a laser cutting apparatus according to each embodiment of the present invention are similar to those of the laser cutting apparatus 1 of the related art explained above. Accordingly, elements having like functions are represented with like reference marks to omit overlapping explanations.

The laser processing method according to the above-mentioned related art heats a work to 900 to 1000 degrees centigrade and jets an oxygen gas to a heated part of the work to burn and melt the heated part with combustion heat. Namely, the related art uses the combustion heat of the work itself to cut the work, and therefore, material of the work is limited to iron (carbon steel).

Thermal cut of steel is carried out by utilizing a temperature difference between a melting point of iron oxide of 1380 degrees centigrade and a melting point of pure iron of 1535 degrees centigrade. Namely, material of a work is burned to generate oxidization heat, the oxidization heat melts iron oxide, and the melted material is blown with gas pressure. These steps are continued to cut the work.

As mentioned above, the laser cutting method according to the related art uses combustion heat of a work itself to melt the work. The related art first heats the work with a laser beam to a temperature at which the work causes an oxidization combustion reaction, and thereafter, continuously jets an oxygen gas so that the work burns to produce combustion heat to melt the work. Even if the laser beam emitted to a melted part of the work is stopped, the work that may be very thick can be cut (this case is of a gas cutting process).

Returning to the laser cutting process, the condenser lens 13 condenses the laser beam LB and irradiates a metallic work with the laser beam to melt or sublimate an irradiated part of the work. An assist gas is jetted toward the irradiated part to remove melted or sublimated material and cut the work. If the work is made of steel and is relatively thick, oxygen and/or air is used as the assist gas to use oxidization reaction heat of the work as well to cut the work.

Using oxygen and/or air as the assist gas to utilize oxidization reaction heat of the work causes no significant problem if the laser beam LB is of a CO2 laser. When the laser beam LB is of a fiber laser whose wavelength is in a one-micrometer band (10-micrometer band in the case of the CO2 laser), the wavelength thereof is short compared to that of a beam of the CO2 laser and achieves a very high energy absorptance on the work. Accordingly, using oxygen and/or air as the assist gas for a relatively thick work causes excessive burning that makes it difficult to keep a proper cut width on a top face of the work.

To deal with this, various tests were made and it was found that even the fiber laser using oxygen and/or air as an assist gas is able to cut a work similar to the CO2 laser if the laser beam LB is formed into a ring beam to disperse and decrease energy density of the laser beam LB. With the use of a fiber laser of the same output, a standard condenser lens and a condenser lens for forming a ring beam were tested to find relationships between spot diameter and kerf width on a top face of a work. Results of the tests are illustrated in FIGS. 4(A) and 4(B). In FIGS. 4(A) and 4(B), a 0-mm focus position agrees with the top face of the work, a minus focus position is below the top face of the work, and a plus focus position is above the top face of the work.

As is apparent from the test results in FIGS. 4(A) and 4(B), cutting a steel sheet with the laser beam LB of the fiber laser and the assist gas of oxygen and/or air with the use of the standard condenser lens widens the top face kerf twice as large as the spot diameter of the laser beam LB. On the other hand, the ring beam RB formed from the laser beam LB is effective to suppress the top face kerf to about 1.5 times as large as the spot diameter or smaller.

When the ring beam RB formed from the laser beam LB irradiates a work, the work is heated but sometimes is not melted, as described in the Patent Literature 1. If the work is not melted, an assist gas made of, for example, nitrogen is unable to remove melted material, and therefore, the work is unable to be cut.

Accordingly, the ring beam RB emitted to a work to cut the work must have a beam diameter that is able to melt the work, and when using oxygen and/or air as an assist gas, the ring beam RB must have a beam diameter to suppress a top face kerf to be small compared to a focus diameter of the beam. Namely, the ring beam RB formed from the laser beam LB to cut a work must have a proper diameter at a position to irradiate the work. It is preferable to properly set a relationship (inner diameter ratio (%)) between an outer diameter and an inner diameter of the ring beam RB at a position where the ring beam RB irradiates the work.

The fiber laser ring beam RB is formed and used at a position below the focus position F of the condenser lens 13. Accordingly, a work to be cut with the laser is so positioned that a top face of the work is below the focus position.

Tests were conducted with the fiber laser ring beam RB to cut a work made of SS400-19t under the conditions of 600 mm/min in cutting speed, 3500 W in output, 1000 Hz in frequency, 80% in duty, 0.06 MPa in oxygen gas pressure, and 0 mm to +6 mm in focus position range. Test results are illustrated in FIGS. 3(A) and 3(B). When the spot diameter of the ring beam RB emitted to the work is 200 μm or smaller, the kerf width is narrow, a flow of the assist gas is bad, and the laser cutting is difficult. When the spot diameter is 700 μm or greater, self-burning occurs and the kerf width on the work top face is hardly controlled to a required value. When the spot diameter is 300 μm, it is possible to cut the work. However, as the work becomes thicker, it becomes difficult to cut the work. When the spot diameter is in a range of 400 μm to 500 μm, processibility is quite good. When the spot diameter is 600 μm, it is possible to cut the work. However, a cut face has rough streaks and self-burning easily occurs.

For the spot diameters of 300 μm, 450 μm, and 600 μm, cutting tests were conducted to determine a range of inner diameter ratios. Results of the tests in connection with surface roughness on a laser cut sectional face of each test piece at a position 2 mm from a top face are illustrated in FIG. 3(A). As is apparent in FIG. 3(A), in the cases of the spot diameters of 300 μm, 450 μm, and 600 μm, it is preferable that the inner diameter ratio is in a range of about 23% to 70%. If the inner diameter ratio is 20% or lower, or 70% or greater, the surface roughness gradually worsens.

Tests were made to find a relationship between focal depth and inner diameter ratio. In connection with the focal depth, the position of the condenser lens 13 is vertically adjusted at 1-mm pitch to confirm a focus width to be able to cut a work. Results of the tests are illustrated in FIG. 3(B). Applying the range of inner diameter ratios illustrated in FIG. 3(A) to FIG. 3(B) makes it clear that a preferable focal depth (Rayleigh length) is in a range of 2 mm to 5 mm.

As is apparent from the above explanation, the fiber laser is usable to form the ring beam RB and cut a work with the ring beam RB and assist gas of oxygen and/or air so that oxidization reaction heat (combustion heat) of the work is also used to cut the work. At this time, the outer diameter of the ring beam is set to 300 μm to 600 μm and the inner diameter ratio thereof to 30% to 70%, to suppress self-burning of the work and perform the laser cutting similar to the CO2 laser. At the same time, a condenser lens having a focal depth (Rayleigh length) of 2 mm to 5 mm is used to properly carry out the laser cutting of the work.

As is already understood from the above, a laser cutting apparatus according to an embodiment of the present invention includes a laser oscillator, a process fiber having a first end connected to the laser oscillator, a laser processing head provided with a collimation lens that forms a parallel beam from a laser beam emitted from a second end of the process fiber, and a ring beam forming unit that forms the parallel beam into a ring beam. The ring beam forming unit includes a condenser lens that provides the ring beam with an outer diameter in a range of 300 μm to 600 μm and an inner diameter ratio in a range of 30% to 70%. The condenser lens has a focal dept of 2 mm to 5 mm.

As mentioned above, using a fiber laser to cut a carbon steel work with oxygen and/or air as an assist gas provides a good cut result if a laser beam from the fiber laser is formed into a ring beam RB having an outer diameter in the range of 300 μm to 600 μm and an inner diameter ratio in the range of 30% to 70%.

When cutting a work with a laser, a piercing process is needed as an initial laser process. When piercing the work, spatters from a pierced location of the work must be prevented from adhering to a lens. To realize this, a gap G between a laser processing head H and the surface of a work W illustrated in FIG. 5 is preferable to be large. After the completion of the piercing, the laser processing head H is moved toward the work W to decrease the gap and it is preferable to maintain the decreased gas when moving the laser processing head H along the surface of the work to cut the work W with a laser beam.

As mentioned above, the ring beam forming unit forms a laser beam into a ring beam after the focus position of the condenser lens. If the gap G between the work W and the laser processing head H is large, the piercing will be carried out with the ring beam. This is not preferable because the ring beam has a low energy density. If the laser processing head H is moved toward the work W to reduce the gap G, a part of the ring beam adjacent to the focus position of the condenser lens or a non-ring part of the laser beam (above the focus position) will carry out the piercing. This is not preferable because it is unable to prevent spatters from the piercing location from adhering to the lens.

For the laser processing head having the ring beam forming unit for forming a laser beam into a ring beam, it is preferable that the piercing of a work is carried out in the vicinity of the focus position F. On the other hand, it is preferable that the cutting of the work is carried out at a position A illustrated in FIG. 6 where the ring beam RB formed from the laser beam LB has an outer diameter in the range of 300 μm to 600 μm and an inner diameter ratio in the range of 30% to 70%.

Figure 6:
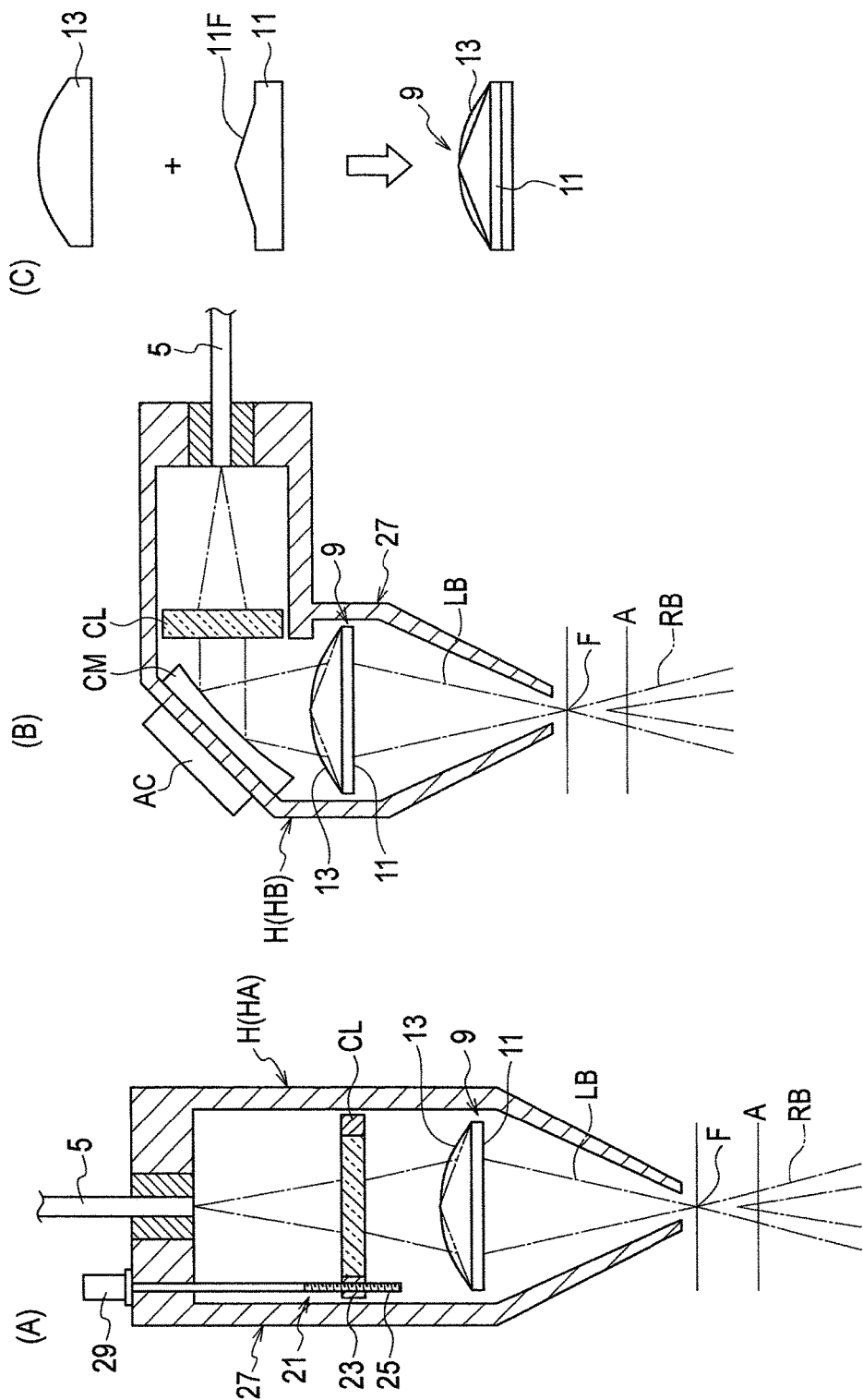
FIG. 6 is an explanatory view schematically and conceptually illustrating configurations of laser processing heads according to embodiments of the present invention.

As is understood from FIG. 6, bringing the focus position F closer to the surface of the work results in bringing the laser processing head H closer to the work surface and bringing the position A closer to the work surface results in separating the laser processing head H away from the work surface. Accordingly, the laser processing head H illustrated in FIG. 6 is configured so that the focus position F is adjustable with respect to the laser processing head H in the direction of an optical axis.

A laser processing head HA schematically and conceptually illustrated in FIG. 6(A) includes, between the emission end of the process fiber 5 and a ring beam forming unit 9, a collimate lens CL that is positionally adjustable along an optical axis of a laser beam LB so that the beam diameter of the laser beam LB made incident to the ring beam forming unit 9 is freely adjustable. More precisely, it includes a position adjusting unit 21 to adjust the position of the collimate lens CL along the optical axis. The position adjusting unit 21 has a nut member 23 arranged at a part of the collimate lens CL and a threaded member 25 screwed into the nut member 23. The threaded member 25 is linked to a servo motor 29 that is arranged at a proper position on a housing 27 of the laser processing head HA.

Under the control of a controller (not illustrated), the servo motor 29 is turned in a normal or reverse direction to adjust the position of the collimate lens CL in the direction of the optical axis of the laser beam LB. The configuration of the position adjusting unit 21 is not limited to that mentioned above. For example, a proper linear actuator such as a linear motor may be adopted to adjust the position of the collimate lens CL. Namely, the position adjusting unit 21 may have an optional configuration.

The ring beam forming unit 9 may be configured in the same manner as the related art illustrated in FIG. 1(B). In FIG. 6, the ring beam forming unit 9 has an axicon lens 11 integrated with a condenser lens 13. As schematically, conceptually, and exaggeratedly illustrated in FIG. 6(C), the axicon lens 11 and aspherical condenser lens 13 are integrated into one by laying the condenser lens 13 over a conical face 11F of the axicon lens 11. In other words, an apex of the axicon lens 11 is left and the conical face 11F is formed into an annular convex face.

The axicon lens 11 and condenser lens 13 may be integrated together by joining a flat face of the axicon lens 11 and a flat face of the condenser lens 13 together.

When the collimate lens CL is brought closer to the emission end of the process fiber 5 away from the ring beam forming unit 9, the diameter of the laser beam LB transmitted through the collimate lens CL increases and enters the ring beam forming unit 9. This results in elongating a focal length. Then, the laser processing head HA keeps a large gap and irradiates the work surface with a part of the laser beam LB adjacent to the focus position F to conduct the piercing of the work.

When the collimate lens CL is moved away from the emission end of the process fiber 5, i.e., closer to the ring beam forming unit 9, the focal length is shortened. As a result, the laser processing head HA keeps a small gap and irradiates the work surface with a part of a ring beam RB adjacent to the position A to conduct the cutting of the work.

A laser processing head HB illustrated in FIG. 6(B) has another configuration. The laser processing head HB has a concave mirror CM to bend and reflect a parallel laser beam LB transmitted through a collimate lens CL toward a ring beam forming unit 9. The concave mirror CM has a proper actuator AC such as a fluid pressure mechanism to freely change a curvature of a concave reflection face of the mirror.

This configuration is able to reflect the parallel laser beam LB transmitted through the collimate lens CL toward the ring beam forming unit 9 by enlarging or reducing the diameter of the laser beam LB to be made incident to the ring beam forming unit 9 to a required value, thereby adjusting a focal length. Accordingly, this configuration provides an effect similar to that provided by the laser processing head HA mentioned above.

As is already understood from the above, the laser processing heads HA and HB are each provided with the beam diameter adjusting unit capable of freely adjusting the diameter of the laser beam LB to be made incident to the ring beam forming unit 9.

Figure 7:
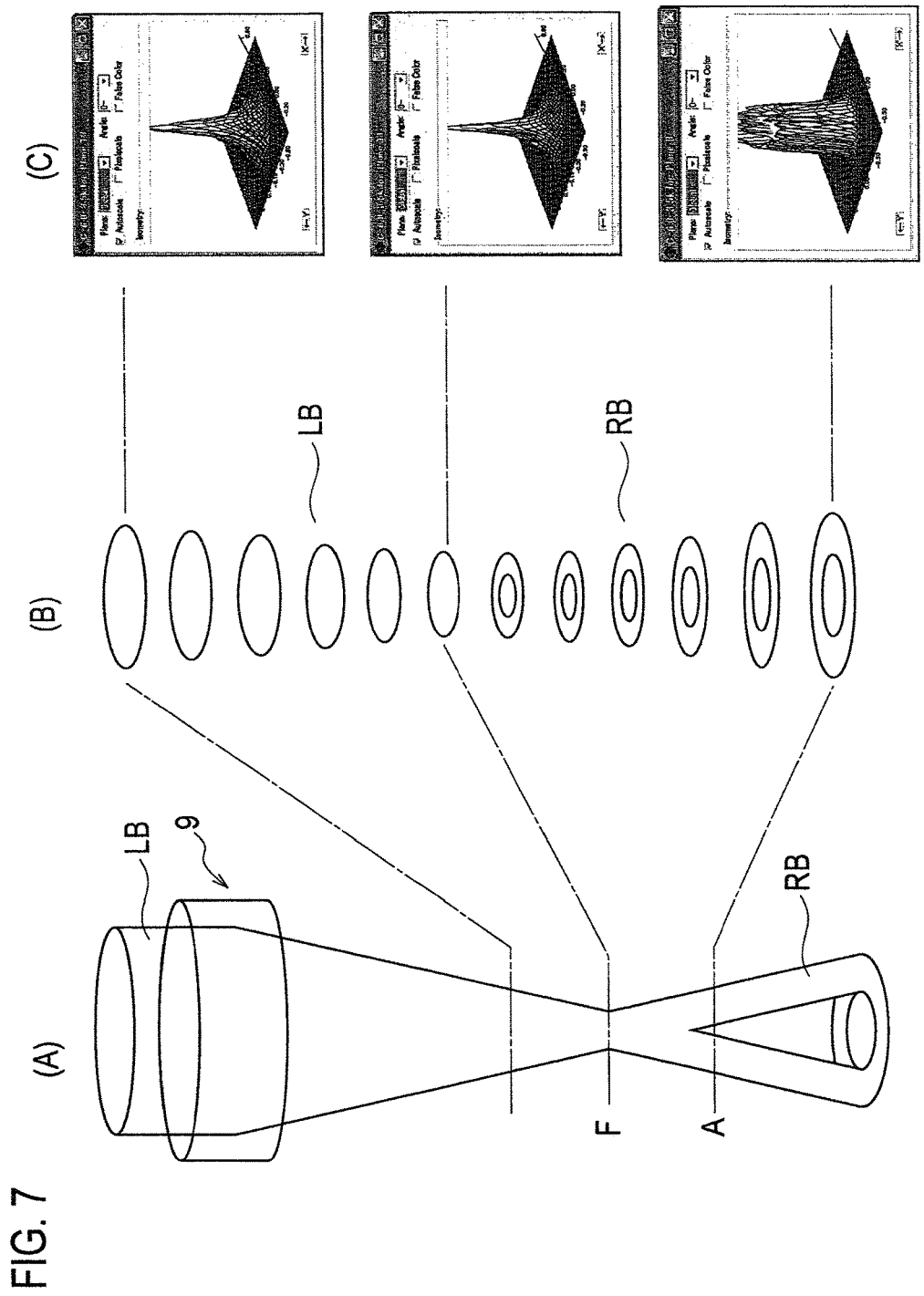
FIG. 7 is an explanatory view schematically and conceptually illustrating sectional shape and energy density relationships of a laser beam and ring beam.

The laser beam LB transmitted through the ring beam forming unit 9 is condensed at the focus position F as schematically illustrated in FIG. 7(A), and below the focus position F, is formed into the ring beam RB.

A sectional shape of the laser beam LB transmitted through the ring beam forming unit 9 has, as illustrated in FIG. 7(B), a minimum beam diameter at the focus position F and is not annular but solid at the focus position F. On the upper side (the ring beam forming unit 9 side) of the focus position F, the laser beam LB is solid and has a larger diameter than at the focus position F. On the lower side of the focus position F, the laser beam LB gradually increases its diameter and forms the ring beam RB that is hollow.

An energy density distribution of the laser beam at each position is illustrated in FIG. 7(C). At the focus position F, the energy density is sharp, large, and high. The energy density on the upper side of the focus position F is smaller and lower than at the focus position F. The energy density around the position A on the lower side of the focus position F where the ring beam RB is formed is smaller and lower than at the focus position F and is circularly distributed.

When cutting a work, a non-ring part of the laser beam LB in the vicinity of the focus position F is used to pierce the surface of the work. At this time, the beam diameter adjusting unit is operated to adjust the diameter of the laser beam LB to be made incident to the ring beam forming unit 9 and the laser processing head HA (HB) is widely separated away from the work surface to secure a wide gap. This suppresses the entering of spatters from a piercing spot into the laser processing head HA (HB).

After the piercing of the work, the beam diameter adjusting unit is operated to adjust the diameter of the laser beam LB to be made incident to the ring beam forming unit 9 and the laser processing head HA (HB) is moved toward the work to secure a smaller gap between the work and the laser processing head. As a result, a part of the ring beam RB in the vicinity of the position A is applied to the work surface and the assist gas of oxygen and/or air is fed to cut the work.

As is understood from the above explanation, cutting a work (carbon steel sheet) with a fiber laser beam with the use of oxygen and/or air as an assist gas is preferably carried out by forming the laser beam LB into the ring beam RB. When carrying out a piercing process as an initial process of the laser beam cutting, a gap between the laser processing head and the surface of the work is kept wide so that a non-ring part of the laser beam LB (around the focus position F of the condenser lens 13) is applied to the work surface.

As mentioned above, the gap is kept wide and the non-ring part of the laser beam LB is used to pierce the work. Namely, a part of the laser beam LB where energy density is high is used to efficiently pierce the work. The wide gap is able to suppress the entering of spatters caused during the piercing into the laser processing head.

After the piercing, the laser beam LB is formed into the ring beam RB and the gap between the laser processing head and the work is narrowed and kept thereat. At the same time, the assist gas of oxygen and/or air is used to cut the work with the laser beam. In this way, the present invention excellently achieves the laser cutting process.

(Effects of Invention)

The present invention forms a laser beam of a one-micrometer waveband into a ring beam having an outer diameter in a range of 300 μm to 600 μm and an inner diameter ratio in a range of 30% to 70%, thereby equalizing energy density levels at the center of the laser beam and suppressing energy density. Setting the inner diameter ratio within the range of 30% to 70% results in setting the energy density to a proper level. The present invention is able to use oxygen and/or air as an assist gas without causing self-burning, and therefore, is able to solve the problems of the related art mentioned above.

(United States Designation)

In connection with United States designation, this international patent application claims the benefit of priority under 35 U.S.C. 119(a) to Japanese Patent Applications No. 2011-203416 filed on Sep. 16, 2011 and No. 2012-177867 filed on Aug. 10, 2012 whose disclosed contents are cited herein.

What is claimed is:

1. A laser cutting method of cutting a work of metallic material with a laser beam of a one-micrometer waveband, the laser beam including a first portion in a region extending between a condenser lens and a focus position of the condenser lens, the first portion of the laser beam extends continuously within an area defined by and entirely filling a perimeter of the first portion of the laser beam, the perimeter of the first portion of the laser beam is defined by a diameter of the first portion of the laser beam, and a second portion of the laser beam, the method comprising:

providing the laser beam;

forming the second portion of the laser beam into a ring beam having inner and outer diameters that expand after passing the second portion of the laser beam through the focus position of the condenser lens, the ring beam of the second portion of the laser beam extending within an area defined between the outer diameter of the ring beam and the inner diameter of the ring beam;

setting the outer diameter of the ring beam to a range of 300 μm to 600 μm;

setting the inner diameter of the ring beam to a range of 30% to 70% of the outer diameter of the ring beam;

applying the first portion of the laser beam to a surface of the work to carry out a piercing process; and thereafter, applying the ring beam of the second portion of the laser beam to the surface of the work and cutting the work with the ring beam having the set outer diameter and the set inner diameter to avoid self-burning of the work.

2. The laser cutting method according to claim 1, wherein a focal depth of the condenser lens is in a range of 2 mm to 5 mm.

3. The laser cutting method according to claim 1, wherein after the piercing process, the applying of the ring beam to the surface of the work includes:

moving a laser processing head toward the surface of the work; and thereafter, moving the laser processing head in a direction along the surface of the work.

4. A laser cutting method of cutting a work of metallic material by employing a laser cutting apparatus that uses a laser beam of a one-micrometer waveband, the laser cutting apparatus including a laser oscillator, a process fiber having a first end connected to the laser oscillator, a second end that emits the laser beam, and a laser processing head provided with a collimation lens that creates a parallel beam from the laser beam emitted from the second end of the process fiber; and a ring beam creator that includes a condenser lens that creates a ring beam from the parallel beam, the laser beam including a first portion in a region extending between the condenser lens and a focus position of the condenser lens, the first portion of the laser beam extends continuously within an area defined by and entirely filling a perimeter of the first portion of the laser beam, the perimeter of the first portion of the laser beam is defined by a diameter of the first portion of the laser beam, and the ring beam comprises a second portion of the laser beam, the method comprising:

providing the laser cutting apparatus;

forming the second portion of the laser beam into the ring beam having inner and outer diameters that expand after passing the second portion of the laser beam through the focus position of the condenser lens, the ring beam of the second portion of the laser beam extending within an area defined between the outer diameter of the ring beam and the inner diameter of the ring beam;

setting the outer diameter of the ring beam to a range of 300 μm to 600 μm;

setting the inner diameter of the ring beam to a range of 30% to 70% of the outer diameter of the ring beam;

applying the first portion of the laser beam to a surface of the work to carry out a piercing process; and thereafter, applying the ring beam of the second portion of the laser beam to the surface of the work and cutting the work with the ring beam having the set outer diameter and the set inner diameter to avoid self-burning of the work.

5. The laser cutting method according to claim 4, further comprising:

providing a focal depth of the condenser lens in a range of 2 mm to 5 mm.

6. The laser cutting method according to claim 4, further comprising:

adjusting a position of the collimation lens in a direction of an optical axis of the laser beam.

7. The laser cutting method according to claim 4, further comprising:

the laser processing head providing a concave mirror that reflects the laser beam toward the ring beam creator, and adjusting a curvature of a concave face of the concave mirror.

8. The laser cutting method according to claim 4, further comprising:

the ring beam creator providing an optical element in which an axicon lens and the condenser lens are integrated.

* * * * *